(12) United States Patent
Suwabe

(10) Patent No.: US 9,348,578 B2
(45) Date of Patent: May 24, 2016

(54) INFORMATION PROCESSING APPARATUS CAPABLE OF UPDATING FIRMWARE, CONTROL METHOD THEREFOR, AND STORAGE MEDIUM STORING CONTROL PROGRAM THEREFOR

(71) Applicant: CANON KABUSHIKI KAISHA, Tokyo, PA (US)

(72) Inventor: Takeshi Suwabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/698,289

(22) Filed: Apr. 28, 2015

(65) Prior Publication Data
US 2015/0317150 A1    Nov. 5, 2015

(30) Foreign Application Priority Data

May 2, 2014  (JP) ................................. 2014-095255

(51) Int. Cl.
*G06F 9/445* (2006.01)

(52) U.S. Cl.
CPC . *G06F 8/65* (2013.01); *G06F 8/665* (2013.01)

(58) Field of Classification Search
None
See application file for complete search history.

(56) References Cited

U.S. PATENT DOCUMENTS

| | | | | |
|---|---|---|---|---|
| 6,711,593 | B1 * | 3/2004 | Gordon | G06F 17/30377 707/615 |
| 6,976,062 | B1 * | 12/2005 | Denby | G06F 8/65 709/203 |
| 7,986,710 | B2 * | 7/2011 | Tominaga | H04L 67/34 370/449 |
| 9,077,627 | B2 * | 7/2015 | Bonas | H04L 41/0836 |
| 2003/0130985 | A1 * | 7/2003 | Driesen | G06F 17/30286 |
| 2004/0024917 | A1 * | 2/2004 | Kennedy | G06F 9/4406 710/1 |
| 2004/0031029 | A1 * | 2/2004 | Lee | G06F 8/65 717/171 |
| 2005/0144616 | A1 * | 6/2005 | Hammond | G06F 8/65 717/173 |
| 2007/0192763 | A1 * | 8/2007 | Helvick | G06F 8/65 717/168 |
| 2008/0244555 | A1 * | 10/2008 | Welvaert | G06F 8/65 717/169 |
| 2011/0191770 | A1 | 8/2011 | INOUE | |
| 2014/0047430 | A1 * | 2/2014 | Kanematsu | G06F 8/65 717/170 |
| 2015/0143352 | A1 * | 5/2015 | Tokumoto | G06F 8/65 717/169 |
| 2015/0169311 | A1 * | 6/2015 | Dickerson | G06F 8/65 717/170 |

FOREIGN PATENT DOCUMENTS

JP    2008282251 A    11/2008

* cited by examiner

*Primary Examiner* — Isaac T Tecklu
(74) *Attorney, Agent, or Firm* — Rossi, Kimms & McDowell LLP

(57) ABSTRACT

An information processing apparatus that is capable of shortening downtime caused by updating firmware. A setting unit sets obtaining time at which update firmware for updating firmware of the information processing apparatus is obtained and update time at which the firmware of the information processing apparatus is updated. An obtaining unit obtains the update firmware from an external apparatus at the obtaining time. A development unit develops the update firmware obtained to a predetermined area. A determination unit determines whether the development unit has completed development of the update firmware at the update time. The information processing apparatus changes to the update starting state from the normal starting state when the update firmware has been developed. And the information processing apparatus cancels the developed update firmware and changes to the update starting state from the normal starting state after cancelling when the update firmware has not been developed.

18 Claims, 13 Drawing Sheets

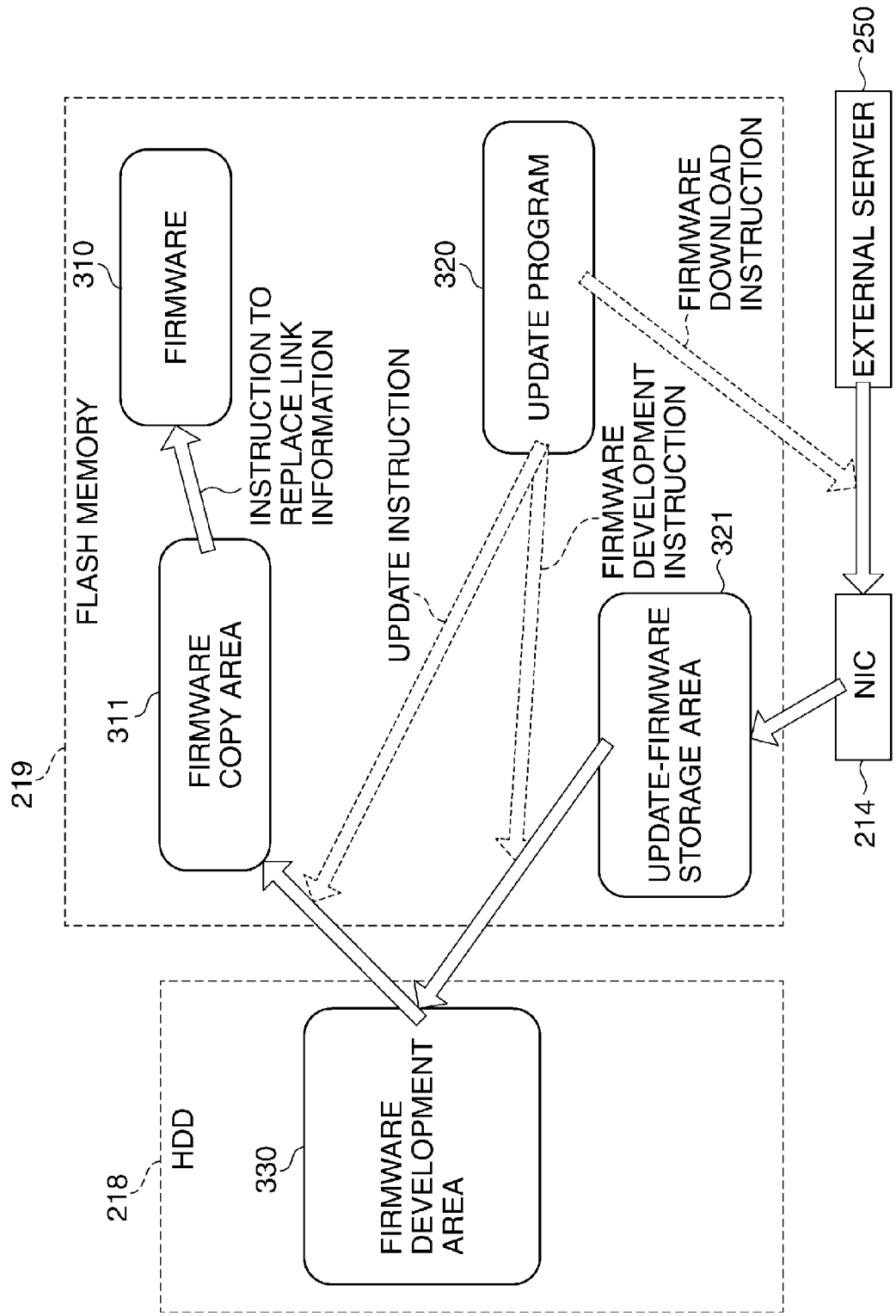

FIG. 4A

```
system-3.1.1.pkg
    |
    +—system.bin
    |
    +—libsystem.so.3.1.1
    |
    +—system-3.1.1.conf
```

FIG. 4B

```
name: system
group: SYSTEM
version: 3.1.1
packager: ishi <ishi@jp.canon.com> files:
  - filename: /bin/system.bin
    mode: executable
  - filename: /lib/libsystem.so.3.1.1
    mode: readonly
  - filename: /etc/system.conf
    mode: readonly
```

FIG. 4C

```
name: system
group: SYSTEM
version: 4.0.0
packager: ishi <ishi@jp.canon.com> files:
  - filename: /bin/system.bin
    mode: executable
  - filename: /lib/libsystem.so.4.0.0
    mode: readonly
  - filename: /etc/system.conf
    mode: readonly
```

INFORMATION PROCESSING APPARATUS CAPABLE OF UPDATING FIRMWARE, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus that is capable of updating installed firmware, a control method therefor, and a storage medium storing a control program therefor.

2. Description of the Related Art

There are well-known periodical update functions that update software of an information processing apparatus automatically and periodically in order to always keep the software up to date.

Some of such periodical update functions allow a user to designate the time at which new software is downloaded.

Furthermore, a function for updating software manually and a function for designating the time at which software is updated are also known. Moreover, the technique that downloads a program and installs it to a computer without a user's operation (i.e., by no click) is also disclosed (for example, see Japanese Laid-Open Patent Publication (Kokai) No. 2008-282251 (JP 2008-282251A)).

However, the above-mentioned publication does not disclose downtime during which a user cannot use the computer, and therefore, does not propose the optimal software update method. Moreover, there is no detailed description of how to process the downloaded software, and it is not clear.

Furthermore, since the periodical update function updates the software after downloading, a user cannot use the computer within update process time.

FIG. 12 is a timing chart showing procedures of a conventional update process.

As shown in FIG. 12, a download process will be performed when download time comes in a normal operation state in which copying, printing, etc. are executable. After finishing the download process, the computer returns to the normal operation state again. Then, when updating is instructed because an update time comes, the computer will reboot and will be in an update starting state.

In the conventional update starting state shown in FIG. 12, coded parts are decoded (developed), firmware is updated, and then, the computer will reboot again. Thus, the conventional technique needs longer downtime for the update process because the downloaded parts are decoded after updating is instructed.

It should be noted that a series of processes in which compressed or encrypted parts are decompressed or decoded, and firmware is updated as mentioned above is referred to as a regular update process in the description.

SUMMARY OF THE INVENTION

The present invention provides an information processing apparatus, a control method therefor, and a storage medium storing a control program therefor, which are capable of shortening downtime caused by updating firmware.

Accordingly, a first aspect of the present invention provides an information processing apparatus that is operatable in a normal starting state and an update starting state comprising a setting unit configured to set obtaining time at which update firmware for updating firmware of the information processing apparatus is obtained and update time at which the firmware of the information processing apparatus is updated, an obtaining unit configured to obtain the update firmware from an external apparatus at the obtaining time set by the setting unit, a development unit configured to develop the update firmware that is obtained by the obtaining unit to a predetermined area, and a determination unit configured to determine whether the development unit has completed development of the update firmware at the update time set by the setting unit. The information processing apparatus changes to the update starting state from the normal starting state in a case where the determination unit determines that the development of the update firmware has been completed. And the information processing apparatus cancels the update firmware that has been developed to the predetermined area and changes to the update starting state from the normal starting state after cancelling the update firmware that has been developed to the predetermined area in a case where the determination unit determines that the development of the update firmware has not been completed.

Accordingly, a second aspect of the present invention provides a control method for an information processing apparatus that is operatable in a normal starting state and an update starting state, the control method comprising a setting step of setting obtaining time at which update firmware for updating firmware of the information processing apparatus is obtained and update time at which the firmware of the information processing apparatus is updated, an obtaining step of obtaining the update firmware from an external apparatus at the obtaining time set in the setting step, a development step of developing the update firmware that is obtained in the obtaining step to a predetermined area, and a determination step of determining whether the development of the update firmware has been developed in the development step at the update time set in the setting step. The information processing apparatus changes to the update starting state from the normal starting state in a case where it is determined that the development of the update firmware has been completed in the determination step. And the information processing apparatus cancels the update firmware that has been developed to the predetermined area and changes to the update starting state from the normal starting state after cancelling the update firmware that has been developed to the predetermined area in a case where it is determined that the development of the update firmware has not been completed in the determination step.

Accordingly, a third aspect of the present invention provides a non-transitory computer-readable storage medium storing a control program causing a computer to execute the control method of the second aspect.

Accordingly, a fourth aspect of the present invention provides an information processing apparatus that is operatable in a normal starting state and an update starting state comprising a setting unit configured to set obtaining time at which update firmware for updating firmware of the information processing apparatus is obtained and update time at which the firmware of the information processing apparatus is updated, an obtaining unit configured to obtain the update firmware from an external apparatus at the obtaining time set by the setting unit, a development unit configured to develop the update firmware that is obtained by the obtaining unit to a predetermined area, and a determination unit configured to determine whether the development unit has completed development of the update firmware at the update time set by the setting unit. The information processing apparatus changes to the update starting state from the normal starting state in a case where the determination unit determines that the development of the update firmware has been completed. And the information processing apparatus continues the development of the update firmware and changes to the update starting state from the normal starting state after the development of the update firmware is completed in a case where the determination unit determines that the development of the update firmware has not been completed.

Accordingly, a fifth aspect of the present invention provides a control method for an information processing apparatus that is operatable in a normal starting state and an update starting state, the control method comprising a setting step of setting obtaining time at which update firmware for updating firmware of the information processing apparatus is obtained and update time at which the firmware of the information processing apparatus is updated, an obtaining step of obtaining the update firmware from an external apparatus at the obtaining time set in the setting step, a development step of developing the update firmware that is obtained in the obtaining step to a predetermined area, and a determination step of determining whether the development of the update firmware has been developed in the development step at the update time set in the setting step. The information processing apparatus changes to the update starting state from the normal starting state in a case where it is determined that the development of the update firmware has been completed in the determination step. And the information processing apparatus continues the development of the update firmware and changes to the update starting state from the normal starting state after the development of the update firmware is completed in a case where it is determined that the development of the update firmware has not been completed in the determination step.

Accordingly, a sixth aspect of the present invention provides a non-transitory computer-readable storage medium storing a control program causing a computer to execute the control method of the fifth aspect.

Accordingly, a seventh aspect of the present invention provides an information processing apparatus that is operatable in a normal starting state and an update starting state comprising a setting unit configured to set obtaining time at which update firmware for updating firmware of the information processing apparatus is obtained and update time at which the firmware of the information processing apparatus is updated, an obtaining unit configured to obtain the update firmware from an external apparatus at the obtaining time set by the setting unit, a development unit configured to develop the update firmware that is obtained by the obtaining unit to a predetermined area, and a determination unit configured to determine whether the development unit has completed development of the update firmware at the update time set by the setting unit. The information processing apparatus changes to the update starting state from the normal starting state in a case where the determination unit determines that the development of the update firmware has been completed. And the information processing apparatus stops the development of the update firmware, changes to the update starting state from the normal starting state, and resumes the development of the update firmware after changing to the update starting state in a case where the determination unit determines that the development of the update firmware has not been completed.

Accordingly, an eighth aspect of the present invention provides a control method for an information processing apparatus that is operatable in a normal starting state and an update starting state, the control method comprising a setting step of setting obtaining time at which update firmware for updating firmware of the information processing apparatus is obtained and update time at which the firmware of the information processing apparatus is updated, an obtaining step of obtaining the update firmware from an external apparatus at the obtaining time set in the setting step, a development step of developing the update firmware that is obtained in the obtaining step to a predetermined area, and a determination step of determining whether the development of the update firmware has been developed in the development step at the update time set in the setting step. The information processing apparatus changes to the update starting state from the normal starting state in a case where it is determined that the development of the update firmware has been completed in the determination step. And the information processing apparatus stops the development of the update firmware, changes to the update starting state from the normal starting state, and resumes the development of the update firmware after changing to the update starting state in a case where it is determined that the development of the update firmware has not been completed in the determination step.

Accordingly, a ninth aspect of the present invention provides a non-transitory computer-readable storage medium storing a control program causing a computer to execute the control method of the eighth aspect.

According to the present invention, since the update firmware obtained is developed to the predetermined area without receiving an update instruction from a user, the downtime caused by updating firmware is shortened.

Further features of the present invention will become apparent from the following description of exemplary embodiments with reference to the attached drawings.

BRIEF DESCRIPTION OF THE DRAWINGS

FIG. 2 is a view showing processes in a flash memory and an HDD at the time of updating firmware installed in the image forming apparatus shown in FIG. 1.

FIG. 4A through FIG. 4C are views showing examples of parts of firmware that are needed to update the firmware installed in the image forming apparatus shown in FIG. 1.

DESCRIPTION OF THE EMBODIMENTS

Hereafter, embodiments according to the present invention will be described in detail with reference to the drawings.

Figure 1:
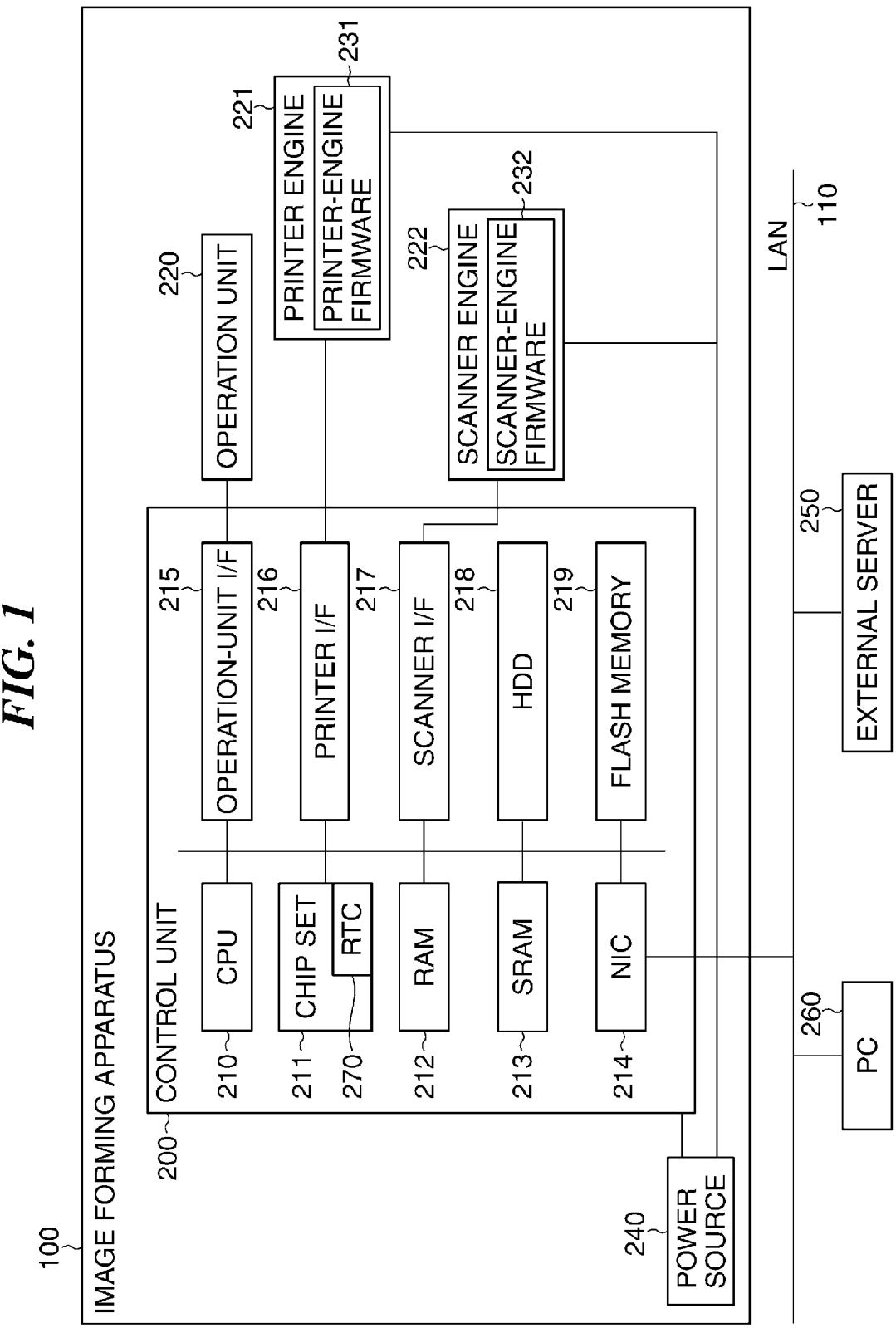
FIG. 1 is a block diagram schematically showing a configuration of an image forming apparatus as an information processing apparatus according to an embodiment of the present invention.

FIG. 1 is a block diagram schematically showing a configuration of an image forming apparatus as an information processing apparatus according to an embodiment of the present invention.

As shown in FIG. 1, the image forming apparatus 100 has a control unit 200, an operation unit 220, a printer engine 221, a scanner engine 222, and a power source 240, and is connected to a PC 260 and an external server 250 through a LAN 110.

The control unit 200 controls the whole image forming apparatus 100. The operation unit 220 displays a variety of information to a user, and receives a user's operational input. The printer engine 221 prints an image of image data output from the control unit 200 onto a storage media like a paper sheet according to printer-engine firmware 231 stored in a nonvolatile storage unit (not shown).

The scanner engine 222 reads an original and outputs image data that shows an original image to the control unit 200 according to scanner-engine firmware 232 stored in the nonvolatile storage unit (not shown).

Moreover, the control unit 200 consists of a CPU 210, a chip set 211, a RAM 212, an SRAM 213, an NIC 214, an operation-unit interface (I/F) 215, a printer interface 216, a scanner interface 217, an HDD 218, and a flash memory 219.

The CPU 210 controls the whole image forming apparatus 100 by executing programs developed to the RAM 212 from the HDD 218 or the flash memory 219.

The RAM 212 is used as a work area of the CPU 210, and stores various kinds of data and various programs. The SRAM 213 has stored setting values, image control values, etc. that the image forming apparatus 100 needs. Memory contents of the SRAM 213 are kept with a backup power source even if the power of the image forming apparatus 100 turns OFF.

The chip set 211 consists of a plurality of integrated circuits containing an RTC (real time clock) 270 that is a time-check exclusive chip. Since power is supplied to the RTC 270 from a built-in battery (not shown) even if the power is not supplied from the power source 240, the RTC 270 operates even if the image forming apparatus 100 is in a sleep state.

Accordingly, the image forming apparatus is able to return from the sleep state as long as the power is supplied to the chip set 211.

The NIC 214 is an interface for connecting with the LAN 110 to communicate with the PC 260 or the external server 250. In the embodiment, the NIC 214 enables to download software from the external server 250 as an external apparatus.

It should be noted that software is referred to as firmware in the following description. Furthermore, update software for updating firmware installed in the image forming apparatus 100 may be referred to as update firmware.

The operation-unit interface 215 is an interface between the operation unit 220 and the control unit 200. The printer interface 216 is an interface between the printer engine 221 and the control unit 200. The scanner interface 217 is an interface between the scanner engine 222 and the control unit 200.

The HDD 218 stores various programs and various kinds of data. The flash memory 219 stores various kinds of data, such as setting values used by the image forming apparatus 100, and various programs. Moreover, the HDD 218 and the flash memory 219 store various files used to update the firmware.

FIG. 2 is a view showing processes in the flash memory 219 and the HDD 218 at the time of updating firmware installed in the image forming apparatus 100 shown in FIG. 1.

As shown in FIG. 2, the firmware 310 has been already installed. Moreover, the update program 320 is stored in the flash memory 219.

When the update firmware becomes downloadable from the external server 250, the update program 320 temporarily stores the update firmware into an update-firmware storage area 321, which is a first storage area reserved in the flash memory 219, according to a firmware download instruction from the CPU 210.

Next, the update program 320 develops the update firmware stored in the update-firmware storage area 321 to a firmware development area 330, which is a second storage area reserved in the HDD 218, according to a firmware development instruction from the CPU 210. This development is a process for decoding the coded update firmware. The coding is compression or encryption. The development is decompression in a case where the coding is compression.

Next, the update program 320 stores the update firmware that has been developed to the firmware development area 330 to a firmware copy area 311, which is a third storage area reserved in the flash memory 219 to execute firmware, according to an update instruction from the CPU 210.

Finally, the update of the firmware 310 is completed by replacing link information used for executing the update firmware stored in the firmware copy area 311 according to an instruction from the CPU 210 at the time of normal starting. The replacement of the link information will be described later.

FIG. 3A through FIG. 3D are views showing screens displayed on the operation unit 220 in FIG. 1.

Figure 3A:
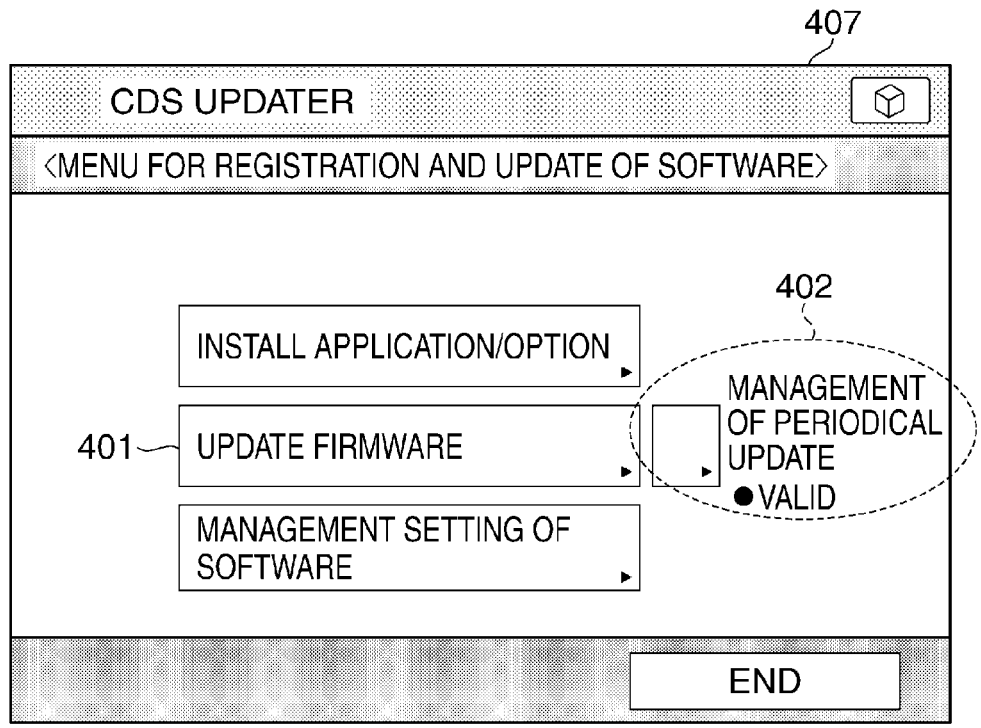
FIG. 3A through FIG. 3D are views showing screens displayed on an operation unit in FIG. 1.
Figure 3B:
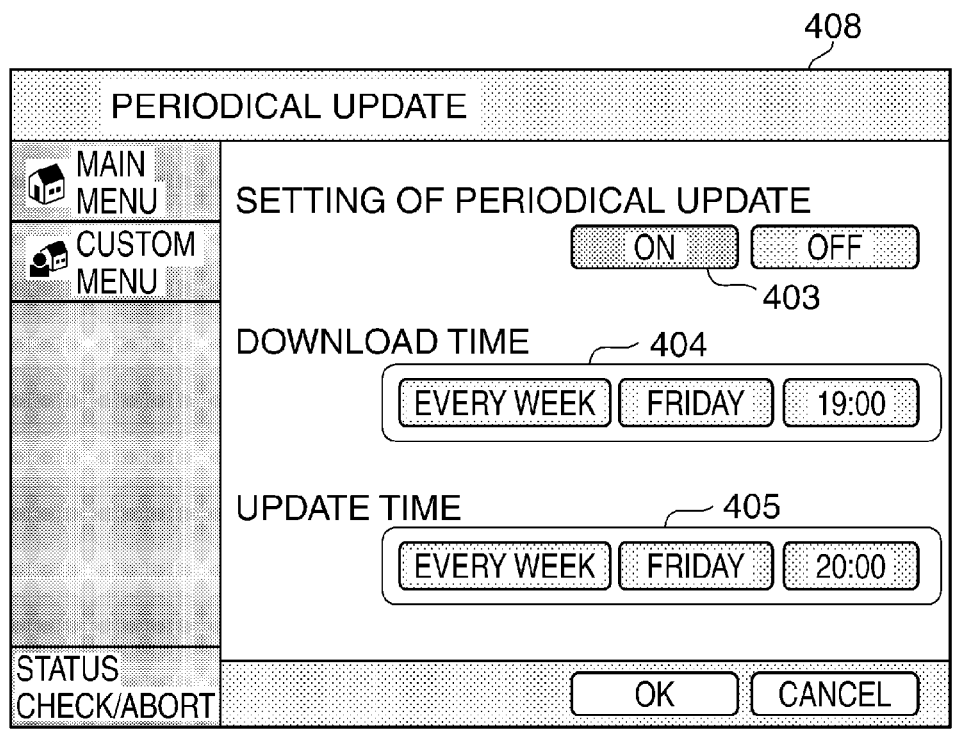

FIG. 3A is a view showing a menu screen 407 for registration and update of software. FIG. 3B is a view showing a setting screen 408 for periodical update.

When a firmware update key 401 in the menu screen 407 in FIG. 3A is touched, the setting screen 408 in FIG. 3B is displayed. Moreover, a periodical-update management field 402 indicates whether the periodical update is valid.

When setting the periodical update, a user selects an ON key 403 in the setting screen 408 in FIG. 3B.

Time at which the update firmware will be downloaded (obtaining time) is set in a download time field 404. Time at which the firmware will be updated with the downloaded update firmware is set in an update time field 405. The contents set on this setting screen 408 are stored in the flash memory 219. The function to allow the settings of the download time (obtaining time) and the update time corresponds to the setting unit.

The setting screen 408 in FIG. 3B shows examples of setting contents where the update firmware will be downloaded at 19:00 on every Friday and the firmware will be updated at 20:00 on every Friday.

Figure 3C:
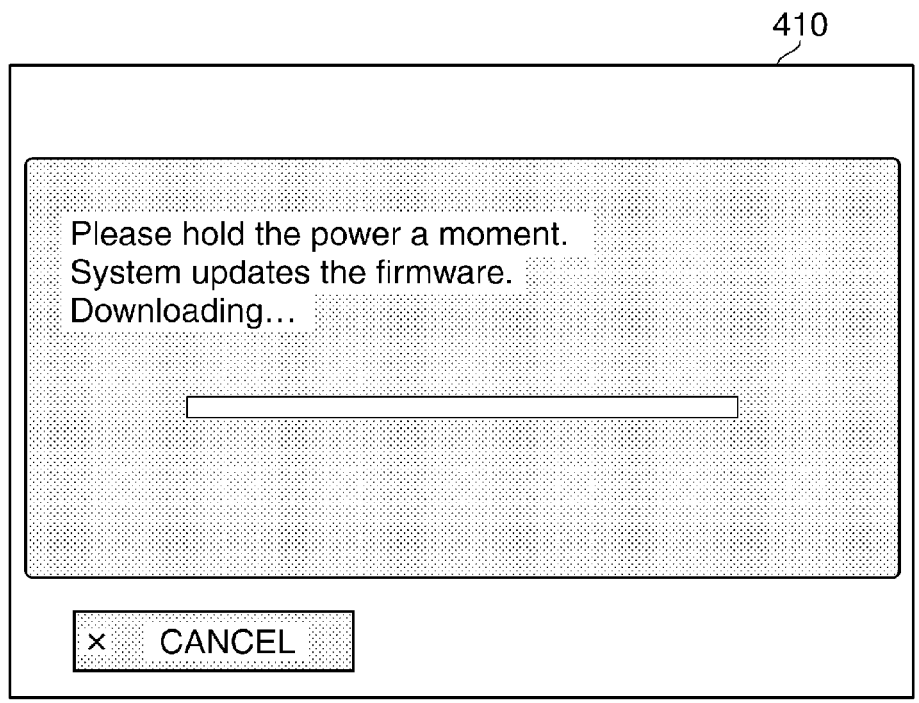

FIG. 3C is a view showing a download screen 410 that is displayed during download of the update firmware.

When the time defined in the download time field 404 in the setting screen 408 comes, download is started and the download screen 410 is then displayed.

Figure 3D:
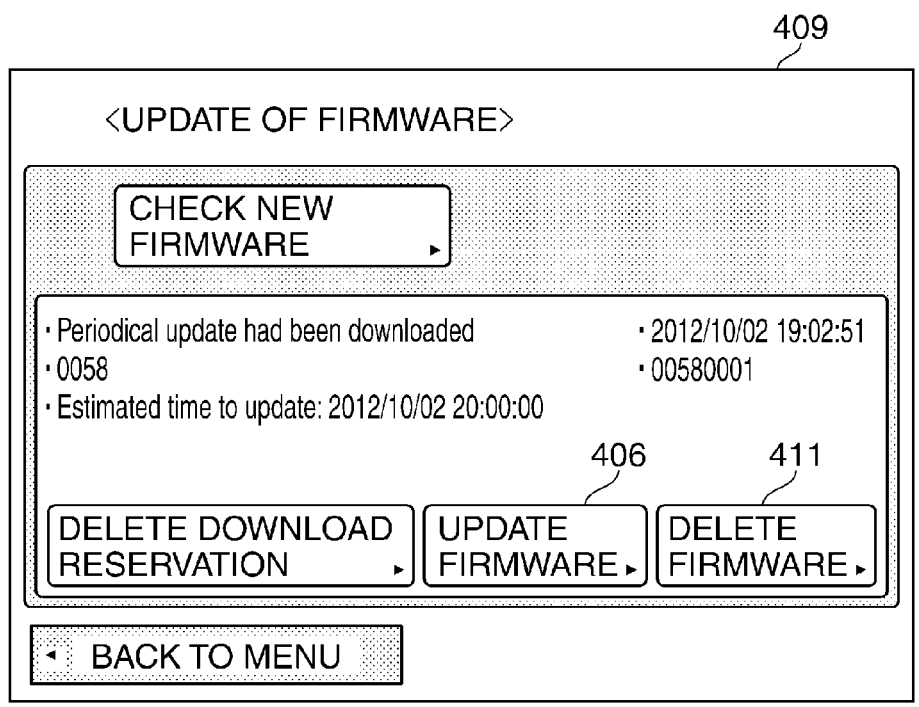

FIG. 3D is a view showing an update screen 409 displayed when the downloaded update firmware is developed to the firmware development area 330.

Since the download has been already completed when this update screen 409 is displayed, a firmware update button 406 and a firmware deletion button 411 are displayed as shown in FIG. 3D.

FIG. 4A through FIG. 4C are views showing examples of parts of firmware that are needed to update the firmware installed in the image forming apparatus 100 shown in FIG. 1.

FIG. 4A is a view showing examples of system parts. As shown in FIG. 4A, the system parts consist of a binary file (system.bin), a library (libsystem.so), and a configuration file (system.conf).

FIG. 4B is a view showing storage locations and attributes of structures of the system parts. As shown in FIG. 4B, the binary file (system.bin) is stored under a /bin directory, and the attribute is an executable file. Moreover, the library (libsystem.so) is stored under a /lib directory, and the attribute is a read-only file. Furthermore, the configuration file (system.conf) is stored under a /etc directory, and the attribute is a read-only file. Moreover, it is shown that a version of the system parts is 3.1.1.

FIG. 4C is a view showing storage locations and the attributes of structures of new system parts. In FIG. 4C, it is shown that a version of the new system parts is 4.0.0. It should be noted that the old parts and the new parts may be different not only in the version but also in the structures. Examples of different structures include replacement of the binary file with another file, usage of a plurality of configuration files, etc. Thus, the update firmware consists of the parts.

Figure 5:
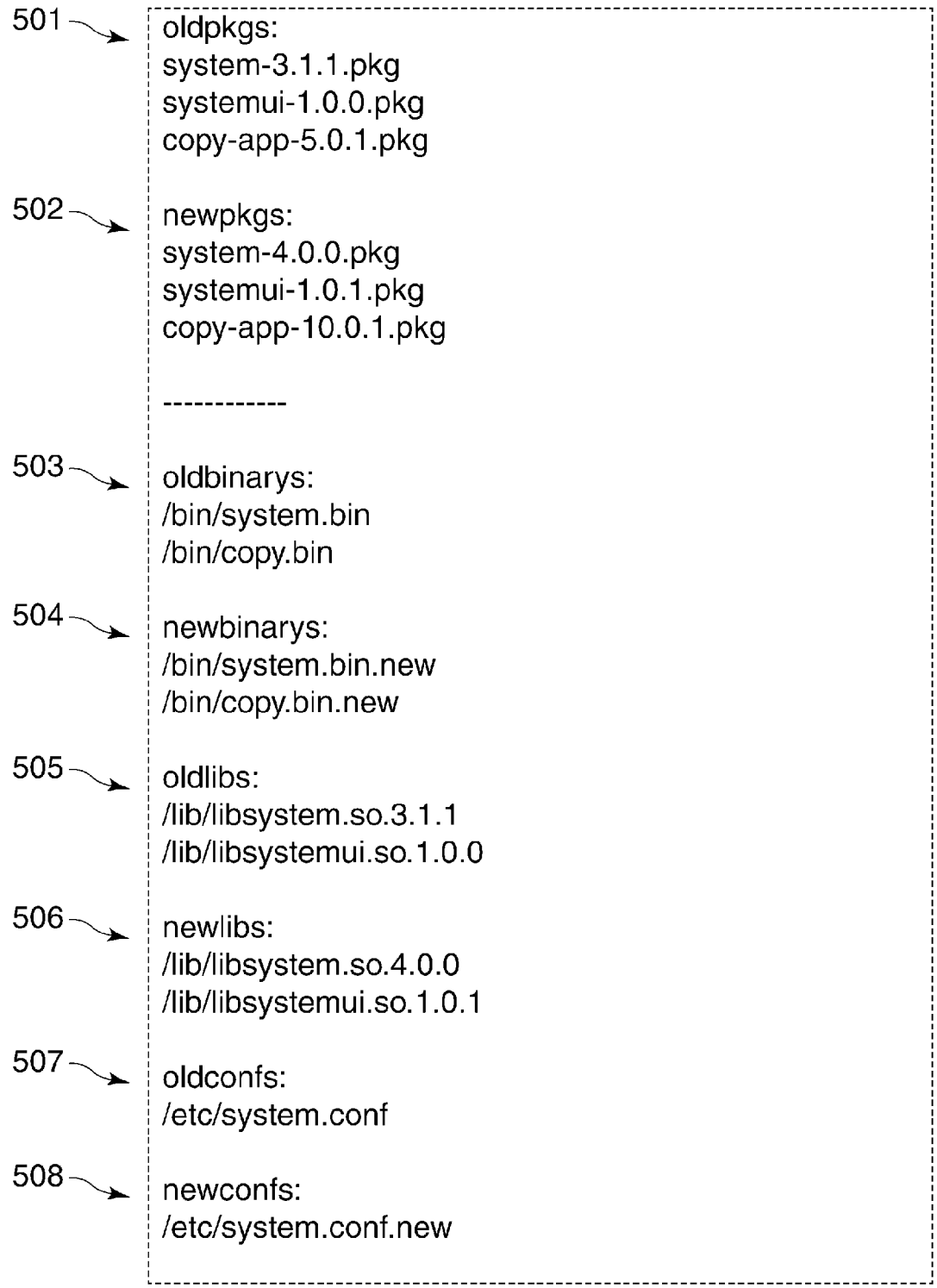
FIG. 5 is a view showing pieces of information managed in order to replace link information in FIG. 2.

FIG. 5 is a view showing pieces of information managed in order to replace link information in FIG. 2.

An "oldpkgs" 501 that indicates old parts and a "newpkgs" 502 that indicates new parts are shown in FIG. 5. The "oldpkgs" 501 and the "newpkgs" 502 show that the system parts in the version 3.1.1 will be replaced with that in the version 4.0.0.

Moreover, the "oldpkgs" 501 and the "newpkgs" 502 show that the parts of "systemui" and "copy-app" will be respectively replaced with parts in new versions. It should be noted that new parts may be parts in old version.

An "oldbinarys" 503 and a "newbinarys" 504 show that the name of the old system parts is "system.bin" as-is and a name of new parts will be "system.bin.new" by attaching a suffix ".new" to the same name "system.bin" in order to distinguish between the new parts and the old parts.

An "oldlibs" 505 and a "newlibs" 506 show that the parts of "libsystem.so" and "libsystemui.so" are respectively replaced with parts in new versions.

Moreover, an "oldconfs" 507 and a "newconfs" 508 show that old parts and new parts are distinguished by attaching the suffix ".new" to the name of the new parts as mentioned above.

Figure 6:
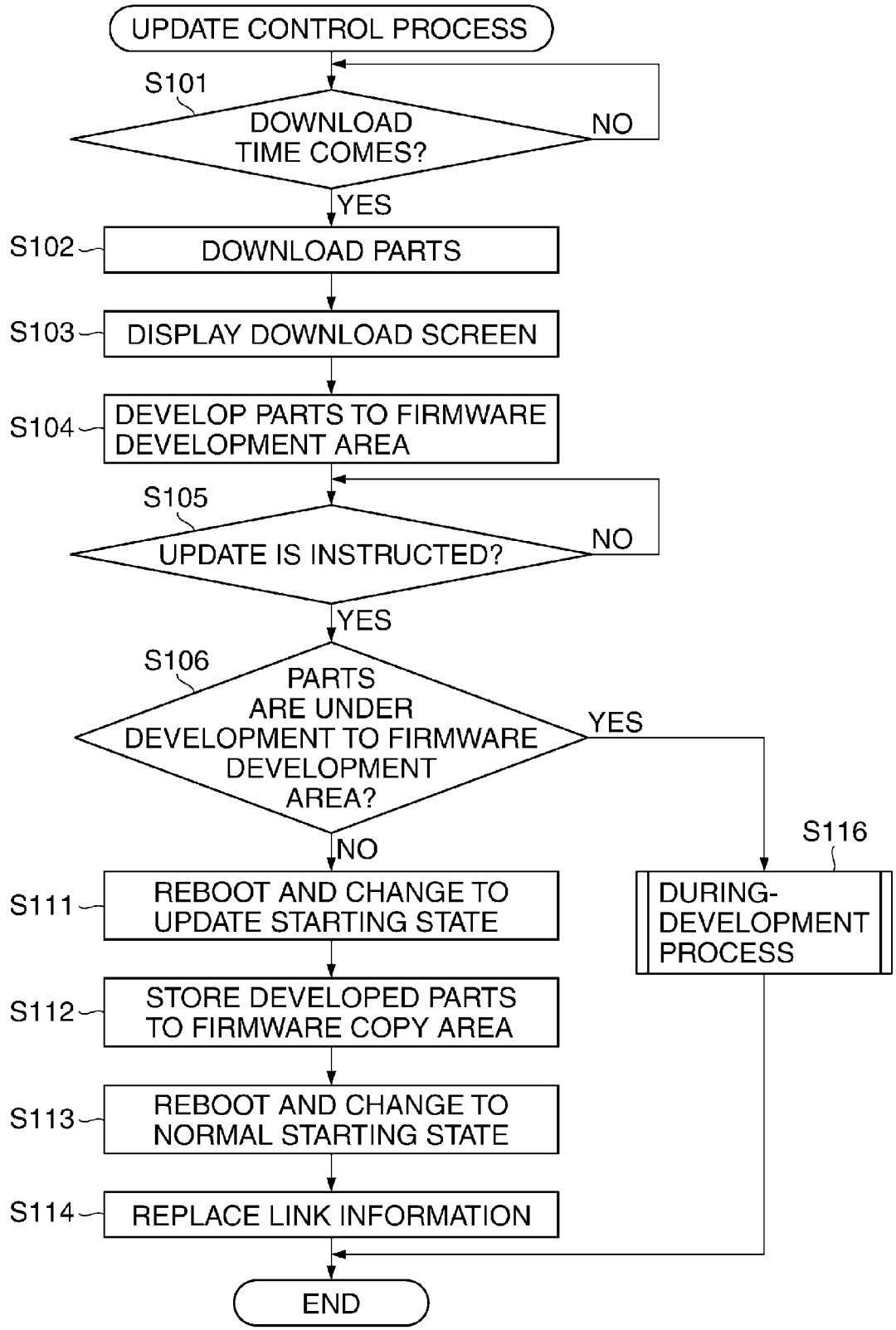
FIG. 6 is a flowchart showing procedures of an update control process executed by a CPU shown in FIG. 1.

FIG. 6 is a flowchart showing procedures of an update control process executed by the CPU 210 shown in FIG. 1.

As shown in FIG. 6, when the download time comes (YES in step S101), the update program 320 downloads parts (step S102) and stores the parts into the update-firmware storage area 321. Furthermore, the download screen 410 is displayed on the operation unit 220 at this time (step S103). The above-mentioned step S102 corresponds to the obtaining unit.

Next, when the download is completed, the update program 320 instantly develops the parts stored in the update-firmware storage area 321 to the firmware development area 330 (step S104). This step S104 corresponds to the development unit.

Then, the update program 320 determines whether update was instructed from the CPU 210 (step S105). When the update was instructed (YES in the step S105), it is determined whether the parts are under development to the firmware development area (step S106). The step S106 corresponds to the determination unit that determines whether development of the update firmware has completed at the update time.

As a result of the determination in the step S106, when it is determined that the parts are under development to the firmware development area (YES in the step S106), a process in which update is instructed during development (hereinafter referred to as a during-development process) mentioned later is performed (step S116), and this process is finished.

On the other hand, as a result of the determination in the step S106, when it is determined that the parts are not under development to the firmware development area (NO in the step S106), the system reboots and changes to an update starting state (step S111).

Then, the update program 320 stores the parts, which are developed to the firmware development area 330, into the firmware copy area 311 (step S112), and the system reboots and changes to a normal operation state (step S113).

Next, the link information mentioned above is replaced (step S114), and this process is finished.

Figure 7:
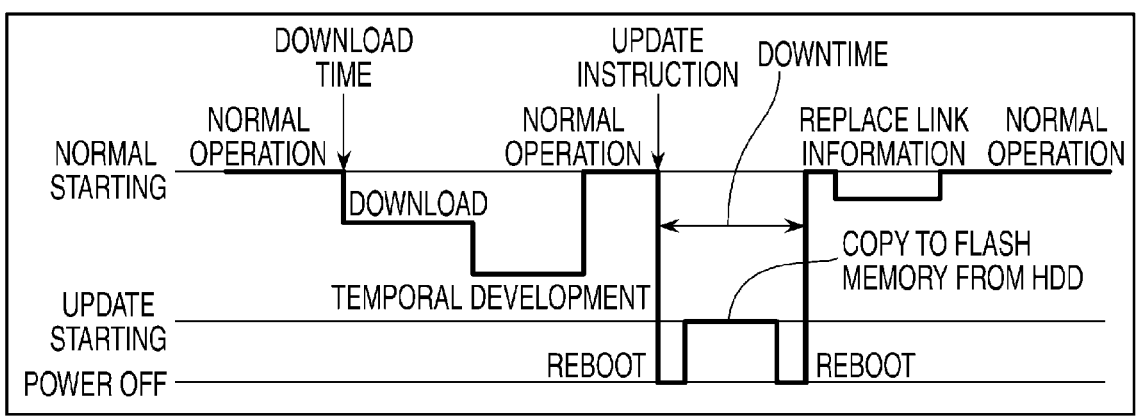
FIG. 7 is a timing chart showing procedures of a process where update is instructed after developing parts of firmware in the update control process in FIG. 6.

FIG. 7 is a timing chart showing procedures of a process where update is instructed after developing parts of firmware (NO in the step S106) in the update control process in FIG. 6.

As shown in FIG. 7, a download process will be performed when download time comes in the normal operation state. After the download process is finished, the parts stored in the update-firmware storage area 321 are developed to the firmware development area 330, and the system returns to the normal operation state again. As shown in FIG. 7, the download and the development are performed as background processes.

After that, when the update time comes or the firmware update button 406 on the update screen 409 is selected by a user, the CPU 210 instructs to update. The system reboots in response to the update instruction, and changes to the update starting state. Then, the parts developed to the firmware development area 330 are stored into the firmware copy area 311.

After that, the system reboots, changes to the normal operation state, and finishes the update process after replacing the link information. Thus, in the example in FIG. 7, the link information is replaced in the background process.

Figure 12:
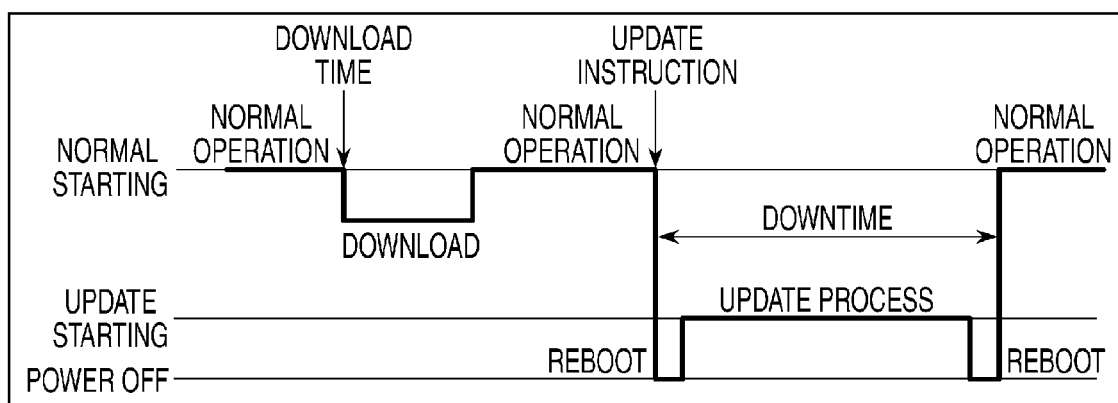
FIG. 12 is a timing chart showing procedures of a conventional update process.

In this way, in the example in FIG. 7, since the downloaded parts are instantly developed, the downtime for the update process is shortened as compared with the conventional technique shown in FIG. 12.

In the update control process in FIG. 7, the update is instructed after the development is completed. On the other hand, when the update is instructed during the development (YES in the step S106), the during-development process will be executed in the step S116.

Hereinafter, three kinds of during-development processes will be described.

Figure 8A:
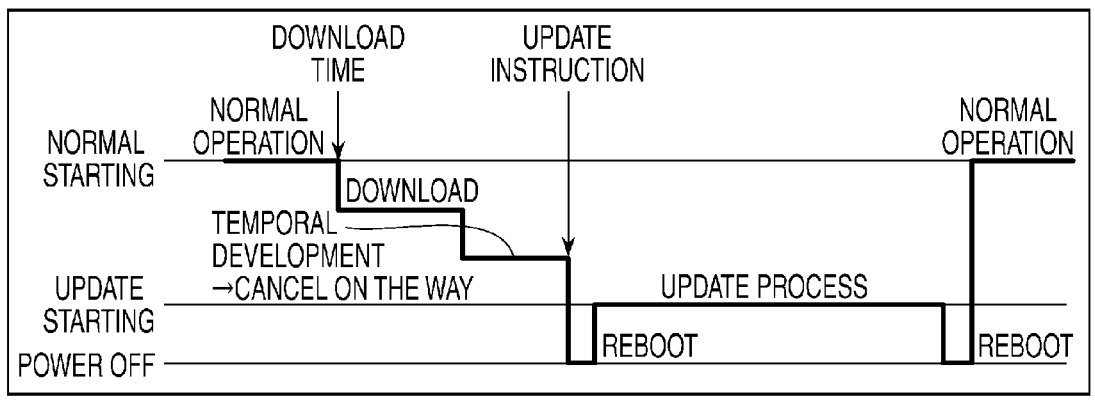
FIG. 8A through FIG. 8C are timing charts showing procedures of during-development processes where update is instructed during development of parts of firmware in the update control process in FIG. 6.
Figure 8B:
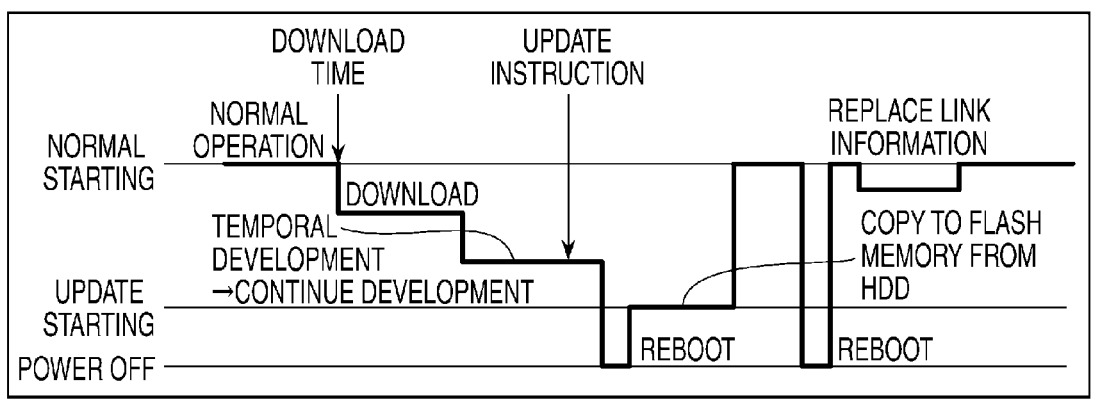
Figure 8C:
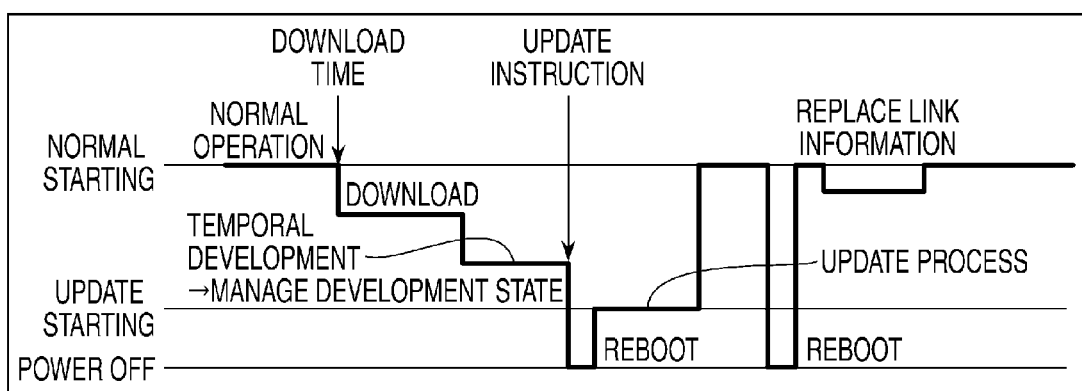

FIG. 8A through FIG. 8C are timing charts showing procedures of the during-development processes A through C where update is instructed during the development of parts of the firmware in the update control process in FIG. 6. It should be noted that the during-development processes A and C are selected in a development stop mode in which the development stops when the update is instructed (i.e., when the update time comes). On the other hand, the during-development process B is selected in a development continuous mode in which the development continues even when the update is instructed. These modes are set beforehand, and shall be stored in the flash memory 219.

FIG. 8A is a timing chart showing procedures of the during-development process A.

As shown in FIG. 8A, a download process will be performed when the download time comes in the normal operation state. After the download process is finished, the parts stored in the update-firmware storage area 321 are developed to the firmware development area 330. Since the update time comes or the firmware update button 406 on the update screen 409 is selected by a user during the development, the CPU 210 shall instruct to update.

When the update is instructed, the development is finished on the way, the developed parts are canceled, and the system reboots and changes to the update starting state. Then, a regular update process is performed.

It should be noted that a warning screen showing that the development will be stopped or the remaining time needed to develop may be displayed on the operation unit 220 when the update time comes or the firmware update button 406 on the update screen 409 is selected by a user during the development.

FIG. 8B is a timing chart showing procedures of the during-development process B.

As shown in FIG. 8B, the download time comes in the normal operation state and the update is instructed during the development to the firmware development area 330. Although the procedures until this point are the same as that in the during-development process A, the development continues to develop all the parts in the during-development process B.

When all the parts have been developed, the system is in the same state as the case where update is instructed after the development is completed. Accordingly, in the during-development process B, the system reboots, changes to the update starting state, and stores the parts, which are developed to the firmware development area 330, to the firmware copy area 311 as with the case where update is instructed after the development is completed.

After changing to the normal starting state, the system reboots, changes to the normal starting state, and finishes the update process after replacing the link information. In this during-development process B, since the firmware is updated after developing all the parts, the downtime is shortened as compared with the during-development process A that cancels the developed parts.

FIG. 8C is a timing chart showing procedures of the during-development process C.

As shown in FIG. 8C, the download time comes in the normal operation state and the development to the firmware development area 330 starts. Although the procedures until this are the same as that in the during-development process A, a development state is managed with the start of the development in the during-development process C. The management of the development state will be described.

Figure 9:
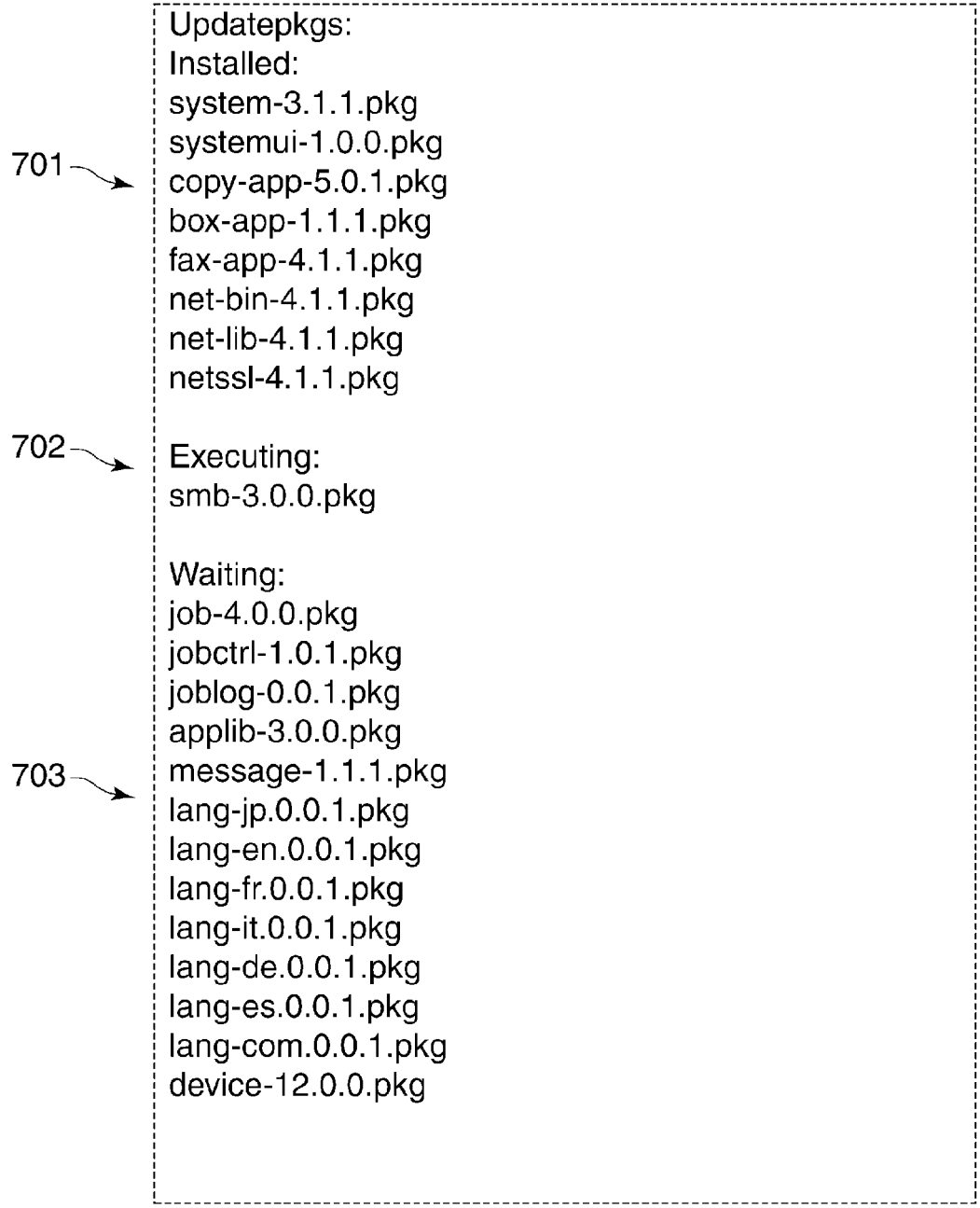
FIG. 9 is a view showing management information that is used to manage a development state in the during-development process in FIG. 8C.

FIG. 9 is a view showing management information 700 that is used to manage the development state in the during-development process C in FIG. 8C.

As shown in FIG. 9, the management information 700 consists of "Updatepkgs" 701, "Executing" 702, and "Waiting" 703.

The "Updatepkgs" 701 shows a developed part. The "Executing" 702 shows a part under development. The "Waiting" 703 shows a part waiting for development (i.e., a part that has not been developed). The management information enables to determine whether a part is a developed part, a part under development, or a part waiting for development. It should be noted that the management information is stored in the RAM 212.

Referring back to FIG. 8C, when the CPU 210 instructs to update during the development, a part that is listed as the "Executing" 702 in the management information is continuously developed. After finishing the part listed as the "Executing" 702, the system finishes the development on the way without developing a part waiting for development, reboots, and changes to the update starting state.

Then, the parts developed to the firmware development area 330 are stored into the firmware copy area 311. On the other hand, the regular update process is performed for a part waiting for development.

When the system reboots and changes to the normal starting state, the update process will be finished after replacing the link information about only the parts stored in the firmware copy area 311.

In the during-development process C, since the developed parts are used, the downtime is shortened as compared with the during-development process A that cancels the developed parts.

Hereinafter, the procedures of the during-development processes A to C will be described with reference to flowcharts.

Figure 10A:
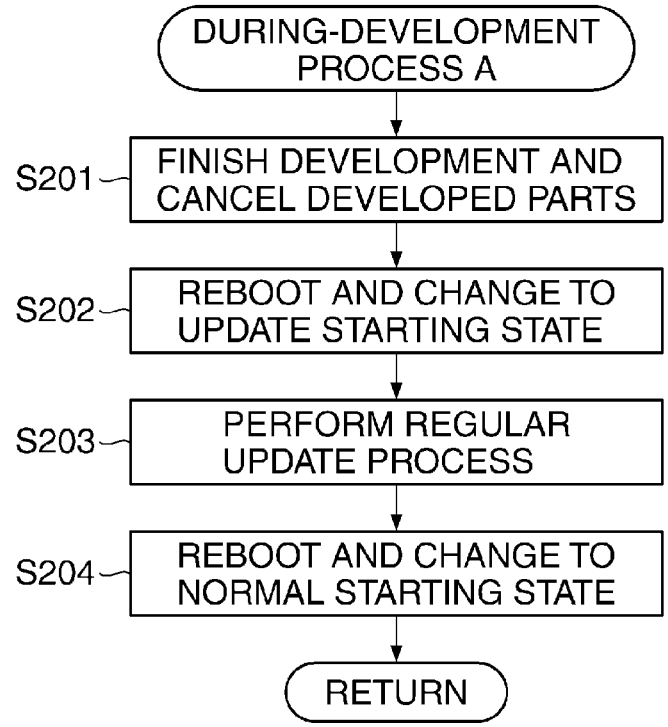
FIG. 10A is a flowchart showing procedures of a during-development process A shown in FIG. 8A.

FIG. 10A is a flowchart showing procedures of the during-development process A.

As shown in FIG. 10A, when it is determined that the parts are under development to the firmware development area in the step S106 in the update control process in FIG. 6 (YES in the step S106), the development is finished and the developed parts are canceled (step S201).

Next, the system reboots and changes to the update starting state (step S202), and performs the regular update process (step S203). Then, the system reboots again, changes to the normal starting state (step S204), returns to the process in FIG. 6, and finishes the update control process.

In this way, in the during-development process A, when the update is instructed during development of the update firmware, the development of the update firmware is finished and the developed update firmware is canceled. Then, the installed firmware is updated without developing the update firmware to the firmware development area 330.

Figure 10B:
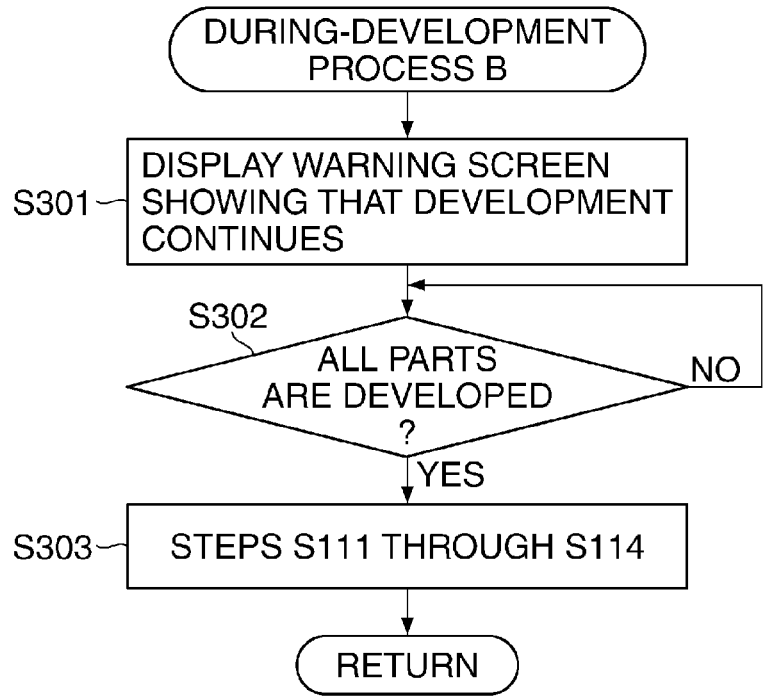
FIG. 10B is a flowchart showing procedures of a during-development process B shown in FIG. 8B.

FIG. 10B is a flowchart showing procedures of the during-development process B.

As shown in FIG. 10B, when it is determined that the parts are under development to the firmware development area in the step S106 in the update control process in FIG. 6 (YES in the step S106), a warning screen showing that the development continues is displayed on the operation unit 220 (step S301).

When all the parts are developed (YES in the step S302), the procedures in the steps S111 through S114 in the update control process in FIG. 6 are performed (step S303). Then, the process returns to FIG. 6, and the update control process is finished.

In this way, in the during-development process B, when the update is instructed during development of the update firmware, the development continues. After finishing the development of the update firmware, the update firmware developed to the firmware development area 330 is stored into the firmware copy area 311.

Figure 11A:
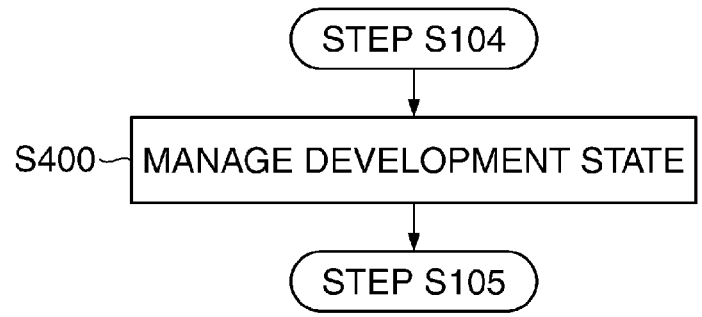
FIG. 11A and FIG. 11B are flowcharts showing procedures of a during-development process C shown in FIG. 8C.

FIG. 11A is a flowchart showing procedures of the during-development process C.

As mentioned above, since the process for managing the development state in the during-development process C, the process is inserted into the update control process in FIG. 6.

FIG. 11A is a flowchart showing a procedure of the process inserted in the update control process in FIG. 6.

In the step S104 in FIG. 6, the parts are developed to the firmware development area 330. After that, the developed state is managed (step S400), and the process proceeds to the step S105.

Figure 11B:
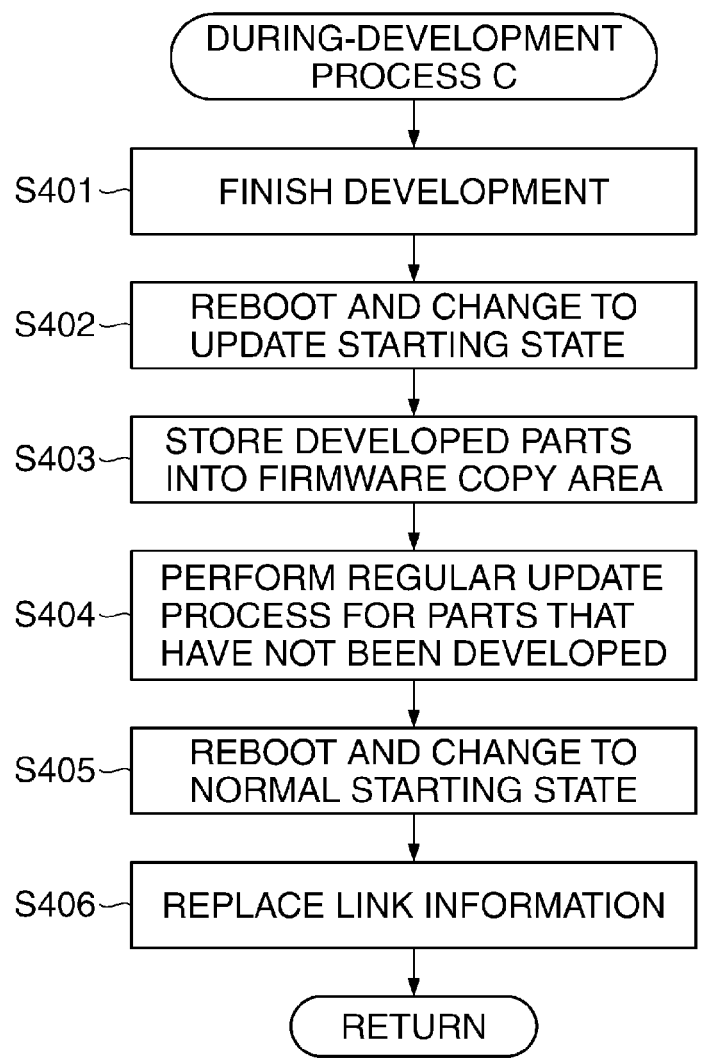

FIG. 11B is a flowchart showing procedures of the during-development process C.

As shown in FIG. 11B, when it is determined that the parts are under development to the firmware development area in the step S106 in the update control process in FIG. 6 (YES in the step S106), the development is finished (step S401). As mentioned above, although the development is finished on the way, a part that is listed as the "Executing" 702 in the management information is continuously developed.

After that, the system reboots and changes to the update starting state (step S402). Then, the parts developed to the firmware development area 330 are stored into the firmware copy area 311 (step S403).

Next, the regular update process is performed for the parts that have not been developed (step S404). Then, the system reboots again, changes to the normal starting state (step S405), replaces the link information (step S406), returns to the process in FIG. 6, and finishes the update control process.

In this way, in the during-development process C, when the update is instructed during development of the update firmware, the development of the update firmware is finished and the parts of the update firmware that were developed before finishing the development are stored into the firmware copy area 311.

Then, the link information for executing the update firmware stored in the firmware copy area 311 is replaced. The installed firmware is updated without developing the parts of the update firmware, which were not developed to the firmware development area 330, to the firmware development area 330.

As described above, in the embodiment, the update firmware is downloaded to the update-firmware storage area 321 in the background process (step S102), and the firmware is developed to the firmware development area 330 in the background process (step S104) just after the completion of the downloading.

Then, when the update of the installed software is instructed, the update firmware developed to the firmware development area 330 is stored into the firmware copy area 311 (step S112), and the link information for executing the update firmware stored in the firmware copy area 311 in place of the installed software is replaced in the background process (step S114). Accordingly, the downtime caused by updating software is shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095255, filed May 2, 2014, which is hereby incorporated by reference herein in its entirety.

What is claimed is:

1. An information processing apparatus that is operable in a normal state and an update state, the information processing apparatus comprising:
a storage device;
a processor configured to execute computer executable instructions recorded on the storage device, the computer executable instructions including instructions, that when executed by the processor, cause the information processing apparatus to:
set an obtaining time at which update firmware for updating firmware of the information processing apparatus is obtained and an update time at which the firmware of the information processing apparatus is updated;
obtain the update firmware from an external apparatus at the set obtaining time;
develop the obtained update firmware to a predetermined area; and
determine whether development of the obtained update firmware has been completed at the set update time,
wherein the information processing apparatus is caused to change to the update state from the normal state in a case where it is determined that the development of the obtained update firmware has been completed, and
wherein the information processing apparatus is caused to cancel the obtained update firmware that has been developed to the predetermined area and change to the update state from the normal state after cancelling the obtained update firmware that has been developed to the predetermined area in a case where it is determined that the development of the obtained update firmware has not been completed.

2. The information processing apparatus according to claim 1, wherein the computer executable instructions further include instructions, that when executed by the processor, cause the information processing apparatus to display a setting screen through which a user designates the obtaining time and the update time,
wherein the obtaining time and the update time are set according to the user's designations input through the setting screen.

3. The information processing apparatus according to claim 1, wherein the information processing apparatus is caused to download the update firmware from the external apparatus on a network.

4. The information processing apparatus according to claim 1, wherein said information processing apparatus is a printing apparatus.

5. An information processing apparatus that is operable in a normal state and an update state, the information processing apparatus comprising:
a storage device;
a processor configured to execute computer executable instructions recorded on the storage device, the computer executable instructions including instructions, that when executed by the processor, cause the information processing apparatus to:

set an obtaining time at which an update firmware for updating firmware of the information processing apparatus is obtained and an update time at which the firmware of the information processing apparatus is updated;

obtain the update firmware from an external apparatus at the set obtaining time;

develop the obtained update firmware to a predetermined area; and determine whether development of the update firmware has been completed at the set update time, wherein the information processing apparatus is caused to change to the update state from the normal state in a case where it is determined that the development of the obtained update firmware has been completed, and wherein the information processing apparatus is caused to continue the development of the obtained update firmware and change to the update state from the normal state after the development of the obtained update firmware is completed in a case where it is determined that the development of the obtained update firmware has not been completed.

6. The information processing apparatus according to claim 5, wherein the computer executable instructions further include instructions, that when executed by the processor, cause the information processing apparatus to display a setting screen through which a user designates the obtaining time and the update time, wherein the obtaining time and the update time are set according to the user's designations input through the setting screen.

7. The information processing apparatus according to claim 5, wherein the information processing apparatus is caused to download the update firmware from the external apparatus on a network.

8. The information processing apparatus according to claim 5, wherein said information processing apparatus is a printing apparatus.

9. An information processing apparatus that is operable in a normal state and an update state, the information processing apparatus comprising:

a storage device;

a processor configured to execute computer executable instructions recorded on the storage device, the computer executable instructions including instructions, that when executed by the processor, cause the information processing apparatus to:

set an obtaining time at which an update firmware for updating firmware of the information processing apparatus is obtained and an update time at which the firmware of the information processing apparatus is updated;

obtain the update firmware from an external apparatus at the set obtaining time;

develop the obtained update firmware to a predetermined area; and determine whether development of the obtained update firmware has been completed at the set update time, wherein the information processing apparatus is caused to change to the update state from the normal state in a case where it is determined that the development of the obtained update firmware has been completed, and wherein the information processing apparatus is caused to stop the development of the obtained update firmware, change to the update state from the normal state, and resume the development of the obtained update firmware after changing to the update state in a case where it is determined that the development of the obtained update firmware has not been completed.

10. The information processing apparatus according to claim 9, wherein the computer executable instructions further include instructions, that when executed by the processor, cause the information processing apparatus to display a setting screen through which a user designates the obtaining time and the update time, wherein the obtaining time and the update time are set according to the user's designations input through the setting screen.

11. The information processing apparatus according to claim 9, wherein the information processing apparatus is caused to download the update firmware from the external apparatus on a network.

12. The information processing apparatus according to claim 9, wherein said information processing apparatus is a printing apparatus.

13. A control method for an information processing apparatus that is operable in a normal state and an update state, the control method comprising:

setting an obtaining time at which an update firmware for updating firmware of the information processing apparatus is obtained and an update time at which the firmware of the information processing apparatus is updated;

obtaining the update firmware from an external apparatus at the set obtaining time;

developing the obtained update firmware to a predetermined area; and determining whether the development of the obtained update firmware has been completed at the set update time, wherein the information processing apparatus changes to the update state from the normal state in a case where it is determined that the development of the obtained update firmware has been completed, and wherein the information processing apparatus cancels the obtained update firmware that has been developed to the predetermined area and changes to the update state from the normal state after cancelling the obtained update firmware that has been developed to the predetermined area in a case where it is determined that the development of the obtained update firmware has not been completed.

14. A non-transitory computer-readable storage medium storing a control program causing a computer to execute a control method for an information processing apparatus that is operable in a normal state and an update state, the control method comprising:

setting an obtaining time at which an update firmware for updating firmware of the information processing apparatus is obtained and an update time at which the firmware of the information processing apparatus is updated;

obtaining the update firmware from an external apparatus at the set obtaining time;

developing the obtained update firmware to a predetermined area; and determining whether the development of the obtained update firmware has been completed at the set update time, wherein the information processing apparatus changes to the update state from the normal state in a case where it is determined that the development of the obtained update firmware has been completed, and wherein the information processing apparatus cancels the obtained update firmware that has been developed to the predetermined area and changes to the update state from the normal state after cancelling the obtained update firmware that has been developed to the predetermined area in a case where it is determined that the development of the obtained update firmware has not been completed.

15. A control method for an information processing apparatus that is operable in a normal state and an update state, the control method comprising:
  setting an obtaining time at which an update firmware for updating firmware of the information processing apparatus is obtained and an update time at which the firmware of the information processing apparatus is updated;
  obtaining the update firmware from an external apparatus at the set obtaining time;
  developing the obtained update firmware to a predetermined area; and
  determining whether the development of the obtained update firmware has been completed at the set update time,
  wherein the information processing apparatus changes to the update state from the normal state in a case where it is determined that the development of the obtained update firmware has been completed, and
  wherein the information processing apparatus continues the development of the obtained update firmware and changes to the update state from the normal state after the development of the obtained update firmware is completed in a case where it is determined that the development of the obtained update firmware has not been completed.

16. A non-transitory computer-readable storage medium storing a control program causing a computer to execute a control method for an information processing apparatus that is operable in a normal state and an update state, the control method comprising:
  setting an obtaining time at which an update firmware for updating firmware of the information processing apparatus is obtained and an update time at which the firmware of the information processing apparatus is updated;
  obtaining the update firmware from an external apparatus at the set obtaining time;
  developing the obtained update firmware to a predetermined area; and
  determining whether the development of the obtained update firmware has been completed at the set update time,
  wherein the information processing apparatus changes to the update state from the normal state in a case where it is determined that the development of the obtained update firmware has been completed, and
  wherein the information processing apparatus continues the development of the obtained update firmware and changes to the update state from the normal state after the development of the obtained update firmware is completed in a case where it is determined that the development of the obtained update firmware has not been completed.

17. A control method for an information processing apparatus that is operable in a normal state and an update state, the control method comprising:
  setting an obtaining time at which an update firmware for updating firmware of the information processing apparatus is obtained and an update time at which the firmware of the information processing apparatus is updated;
  obtaining the update firmware from an external apparatus at the set obtaining time;
  developing the obtained update firmware to a predetermined area; and
  determining whether the development of the obtained update firmware has been completed at the set update time,
  wherein the information processing apparatus changes to the update state from the normal state in a case where it is determined that the development of the obtained update firmware has been completed, and
  wherein the information processing apparatus stops the development of the obtained update firmware, changes to the update state from the normal state, and resumes the development of the obtained update firmware after changing to the update state in a case where it is determined that the development of the obtained update firmware has not been completed.

18. A non-transitory computer-readable storage medium storing a control program causing a computer to execute a control method for an information processing apparatus that is operable in a normal state and an update state, the control method comprising:
  setting an obtaining time at which an update firmware for updating firmware of the information processing apparatus is obtained and an update time at which the firmware of the information processing apparatus is updated;
  obtaining the update firmware from an external apparatus at the set obtaining time;
  developing the obtained update firmware to a predetermined area; and
  determining whether the development of the obtained update firmware has been completed at the set update time,
  wherein the information processing apparatus changes to the update state from the normal state in a case where it is determined that the development of the obtained update firmware has been completed, and
  wherein the information processing apparatus stops the development of the obtained update firmware, changes to the update state from the normal state, and resumes the development of the obtained update firmware after changing to the update state in a case where it is determined that the development of the obtained update firmware has not been completed.

* * * * *